(12) United States Patent
Beaudou

(10) Patent No.: US 6,671,522 B1
(45) Date of Patent: Dec. 30, 2003

(54) THERMAL CONTROLLED BY A SUBSCRIBER'S IDENTIFICATION MODULE FOR RUNNING AN APPLICATION

(75) Inventor: M. Patrice Beaudou, Puteux (FR)

(73) Assignee: Societe Francaise du Radiotelephone, Paris la Defense (FR)

( * ) Notice: Subject to any disclaimer, the term of this patent is extended or adjusted under 35 U.S.C. 154(b) by 0 days.

(21) Appl. No.: 09/512,996

(22) Filed: Oct. 20, 1999

(30) Foreign Application Priority Data

| Oct. 22, 1998 | (FR) | 98 13455 |
| Nov. 4, 1998 | (FR) | 98 14044 |
| Dec. 4, 1998 | (FR) | 98 15502 |

(51) Int. Cl.[7] .............. H04B 1/38; H04B 1/40; H04M 3/00; H04Q 7/20
(52) U.S. Cl. ................. 455/558; 455/418; 455/420
(58) Field of Search .................. 455/88, 407, 408, 455/410, 411, 414, 420, 425, 557, 558, 418, 419

(56) References Cited

U.S. PATENT DOCUMENTS

| 6,032,255 A | * | 2/2000 | Shim et al. ............... 713/2 |
| 6,092,133 A | * | 7/2000 | Erola et al. ............... 710/102 |
| 6,097,967 A | * | 8/2000 | Hubbe et al. ............. 455/558 |
| 6,266,527 B1 | * | 7/2001 | Mintz ......................... 455/423 |
| 6,292,668 B1 | * | 9/2001 | Alanara et al. ........... 455/466 |
| 6,400,958 B1 | * | 6/2002 | Isomursu et al. ......... 455/466 |

FOREIGN PATENT DOCUMENTS

| EP | 0 626 644 | 11/1994 |
| WO | 96/25828 | 8/1996 |
| WO | 97/04609 | 2/1997 |
| WO | 98/32089 | 7/1998 |
| WO | 98/41220 | 9/1998 |

* cited by examiner

Primary Examiner—William Trost
Assistant Examiner—Meless Zewdu
(74) Attorney, Agent, or Firm—Kinney & Lange, P.A.

(57) ABSTRACT

A process for running an application has a terminal, which runs at least part of a terminal application under the control of a subscriber identification module cooperating with the terminal. The subscriber identification module and the terminal form part of a mobile station included in a radio communication system. Generally, the subscriber identification module sends a command to the terminal for the terminal to run at least part of a terminal application. The terminal executes the command, to run at least part of a terminal application and to take control.

10 Claims, 2 Drawing Sheets

THERMAL CONTROLLED BY A SUBSCRIBER'S IDENTIFICATION MODULE FOR RUNNING AN APPLICATION

BACKGROUND OF THE INVENTION

The domain of the invention is radio communication systems with mobiles. More precisely, the invention relates to running an application (or at least a part of an application) by a terminal forming part of a mobile station.

In particular, but not exclusively, this mobile station may be included in a GSM (Global System for Mobile communications), DCS 1800 (Digital Cellular System 1800 MHz), PCS 1900 (Personal Communication System), DECT (Digital European Cordless Telecommunications), or UMTS (Universal Mobile Telecommunication System) type of radio communication system.

Conventionally, a mobile station comprises a terminal (or ME for "Mobile Equipment" according to the GSM terminology) cooperating with a Subscriber Identity Module (SIM in the GSM terminology) or DAM "DECT Authentication Module" in the DECT terminology). It should be noted that the mobile station is sometimes also called a mobile radiotelephone or a portable telephone, depending on the system.

Furthermore, this invention is applicable to any type of mobile station, and particularly a mobile station that sends and/or receives voice and/or data. In the case of data transmission/reception, the terminal may be connected to a micro-computer (preferably a portable) that processes transmitted/received data.

In a known manner, in general the terminal can execute a large number of applications called "terminal applications" in the rest of the description. For example, the terminal can execute service applications (described in more detail below), message output applications (for example such as SMS editors, etc.).

Service applications, when they are executed, enable the terminal to benefit from the service (s) offered by a services server after communication has been setup between the terminal and the services server. These are particularly browsers, that enable the terminal to navigate within an Internet type computer network after a communication has been setup between the terminal and an access platform, or payment and/or booking and/or viewing applications, enabling the terminal to benefit from at least one payment and/or booking and/or viewing service offered by a services server, after a communication has been setup between the terminal and the services server.

At the present time, the decision to run an application (or at least part of an application) is always made in the terminal, either "automatically" by the terminal itself, or by the user by choosing a function (which may be proposed) This choice is usually offered to the user through a terminal main application, sometimes also called a "terminal menu" or "manufacturer's menu" that the user uses to choose a function among the set of functions available on the terminal. Obviously, the terminal manufacturer would like to propose the most extensive possible choice of functions in his "manufacturer's menu", and designs his terminal with this purpose in mind.

For example, it is already possible with some mobile stations to access an Internet type computer network. In order to do this, the terminal must have a special key (Internet access key) that can be used to make the terminal start a browser (which is a specific terminal application). In the manufacturer's menu on this type of terminal, the User is prompted to choose the "Internet access" function by pressing on the "Internet access key". The following procedure is used to access the worldwide Internet network; after the user has pressed the "Internet access key", the terminal attempts to setup communication with an access platform; if this communication is successfully setup, the terminal starts the browser so that the terminal can browse the Internet network. In summary, in the mobile station, only the terminal is involved since the Internet access key that attempts to setup communication with the access platform which starts the browser is located on the terminal.

It is found that there are several disadvantages if the decision to run an application (or at least part of it) is always made in the terminal.

Firstly, this implies that the user is not completely free in the choice of its terminal, since it may or may not be possible to run a specific application from a particular terminal depending on the terminal (corresponding to whether or not a specific function is available).

For example, in the case mentioned above of the access to an Internet type computer network, the user must choose a terminal with an "Internet access key". Also, regardless of the operator to which he has subscribed, the user is constrained in his access to the Internet type computer network by technical choices made by the manufacturer of his terminal. In particular, the user does not choose the number of the access platform, or information useful to the browser after it has been started, for example such as IP (Internet Protocol) type numbers, secret browser authentication keys and/or data encryption keys, short message service center (SMS Center) numbers, etc.

Furthermore, this implies a limitation in the number of functions offered by the "Operator application" (or "SIM application", or "operator menu"). Remember that the "operator menu" is stored in the subscriber identification module and is executed by it. The various operators propose different "operator menus" to their subscribers through the subscriber identification module that they distribute and which are specific to them. Obviously, each operator attempts to offer a maximum number of functions within his "operator menu". However, the operator menu can only propose functions that correspond to terminal applications that can be run by the terminal under the control of the subscriber identification module. Other functions (that correspond to terminal applications that can only be run by the terminal under the control of the terminal itself) cannot be included within the "manufacturer's menu" (already discussed above).

It should be noted that the same function (for example an Internet access function) may be proposed in the "operator" menu and in the "manufacturer" menu.

BRIEF SUMMARY OF THE INVENTION

One particular purpose of the invention is to overcome these various disadvantages in the state of the art.

More precisely, one of the objectives of this invention is to provide a process by which an application (or at least part of an application) can be run by a terminal under the control of a subscriber identification module.

Another purpose of the invention is to propose one or several additional functions within an "operator menu", namely one or several functions that can be run by the terminal under the control of the subscriber identification module.

Another purpose of the invention is to provide this type of process by which a user can access the services server starting from any mobile station (in the sense that this mobile station is not necessarily provided with an Internet access key like that mentioned above). To the best knowledge of the inventor, at the moment no existing "operator menu" offers "access to a services server" (for example such as a "Internet access") among the possible choices.

Another purpose of the invention is to provide a similar process enabling the user to access a services server using technical choices made by his operator (rather than by his terminal manufacturer).

An additional objective of the invention is to supply a similar process that is easy to use and inexpensive.

This various objectives, and others that will become clear later, are achieved according to the invention by means of a process by which the terminal runs at least part of a terminal application, under the control of a subscriber identification module cooperating with the said terminal, the said subscriber identification module and the said terminal being included within a mobile station included in a radio communication system, the said process comprising the following steps:

the subscriber identification module sends a command to the terminal, for the terminal to run at least part of a terminal application;

the terminal executes the said start command, to run the said terminal application, or part of it, and to take control.

Therefore, the general purpose of the invention is to initiate the procedure by which the terminal runs a terminal application (or part of an application), from the subscriber identification module (and not in the terminal itself). This has never been envisaged in the past since the natural reaction of an expert in the subject has always been that the terminal should initiate this type of startup because the terminal application is located on the terminal and is executed by the terminal.

In order to enable to implement the process according to this invention, the subscriber identification module must be capable of generating a new type of command, namely an "application start command", and the terminal must be capable of recognizing it and executing it.

After it has been started, the terminal runs the terminal application in the conventional manner and therefore it will not be described in more detail herein.

In a first embodiment of the invention, the said process comprises the following steps:

the subscriber identification module sends a specific command to the terminal, to make it run at least part of a terminal application, the said specific command being specific to the said part (or all) of a terminal application;

the terminal executes the said specific command, to run the said part or all of a terminal application and to take control.

Thus in this first embodiment, a command specific to the application (or part of the application) to be run is used.

Advantageously, the said specific command belongs to a set comprising several specific distinct commands, such that each can run at least part of a distinct terminal application.

Preferably, each specific command is a new command in the "SIM Application Toolkit" command set. Remember that this type of command includes a mutual identification and/or authentication mechanism between the terminal and the subscriber identification module, and/or confirmation by the user of commands entered in the terminal (so that the terminal cannot execute commands unknown to the user). For further information about the "SIM Application Toolkit", refer to the ETSI standard "GSM 11.14 (Phase 2+)", which is inserted here by reference.

In a second particular embodiment of the invention, the said process comprises the following steps:

the subscriber identification module sends a first generic command to the terminal, to make the terminal start a second specific command to run at least part of a terminal application, the said first generic command including at least an identifier of the second specific command as a parameter, the said second specific command being specific to the said part (or all) of a terminal application;

the terminal executes, the said first generic command so as to extract the said second specific command, and then executes the said second specific command so as to run the said part (or all) of a terminal application and to take control.

Thus in this second embodiment, a first generic command is used in which a second command specific to the application (or part of application) to be run is "encapsulated".

Advantageously, the second specific command belongs to a set comprising a number of second distinct specific commands, each of which can run at least part of a distinct terminal application.

Preferably, the said second specific command is an "AT" command. In other words, it is a new and ingenious use of existing or future AT commands. Thus, the cost of developing new commands is eliminated, or reduced. Remember that "AT commands" (or "ATtention commands") were originally designed to enable a TE "Terminal Equipment", for example a computer) to order an ME "Mobile Equipment" or radio communication terminal) to which it is connected, to carry out specific predetermined actions. Further information about these "AT commands" is given firstly in the ETSI standard "GSM 07.07" and secondly in the ITU-T recommendation V25ter, which are inserted here by reference. Remember also that some AT commands were developed by different manufacturers and are not standardized (they are said to be "proprietary").

Preferably, the first said generic command is a new command in the "SIM application Toolkit" command set.

Preferably, the said step in which the subscriber identification module sends the start command to the terminal is associated with a choice of an additional function, the said choice being offered to a user when the said subscriber identification module executes an operator application, the said send step being carried out if the user validates the choice of the said associated function. Thus, the operator application (or "operator menu") can include one or several new functions.

Advantageously, the said terminal application, at least part of which is run by the terminal, belongs to the group comprising:

service applications which, if executed, enable the terminal to benefit from the service(s) offered by a services server after communication has been setup between the said terminal and the said services server;

message editing applications;

agenda editing applications.

This list is in no way exhaustive. In particular, agenda editing applications include subscriber agendas (ADN for "Abbreviated Dialing Numbers" and FDN for "Fixed Dialing Numbers") and operator agendas (SDN for "Services Dialing Numbers").

It should be noted that in the case of an access to a services server (including running a services application), the process according to the invention in no way imposes that the terminal is provided with a "services server access key".

Some particular examples of the said services are:

browsers, which enable the terminal to browse through an Internet type computer network, after a communication has been setup between the terminal and an access platform;

payment and/or booking and/or viewing applications, enabling the terminal to benefit from at least one payment service and/or booking and/or viewing service available through a services server, after communication has been setup between the terminal and the server.

Advantageously, if the terminal application is a services application, the said specific command is configured with the set of parameters comprising:

a services server telephone number identifier, and possibly, one or more call parameters, and the step in which the terminal executes the said specific command comprises the following steps:

the terminal attempts to setup a communication with the said services server, according to the said parameter set;

if the said communication with the services server is actually setup, the terminal starts execution of the said part or all of the services application, such that the terminal can benefit from the service(s) offered by the said services server.

The invention also relates to a subscriber identification module of the type included in a mobile station in a radio communication system cooperating with a terminal, comprising means of implementing the above-mentioned process in which the said terminal runs part or all of a terminal application, under the control of the said subscriber identification module.

The invention also relates to a terminal of the type included in a mobile station in a radio communication system and cooperating with a subscriber identification module, comprising means of implementing the above mentioned process in which the said terminal runs at least part of a terminal application, under the control of the said subscriber identification module.

BRIEF DESCRIPTION OF THE DRAWINGS

Other characteristics and advantages of the invention will become clear by reading the following description of a preferred embodiment of the invention given for information purposes and in no way restrictive, and attach drawings in which.

DETAILED DESCRIPTION

Figure 1:
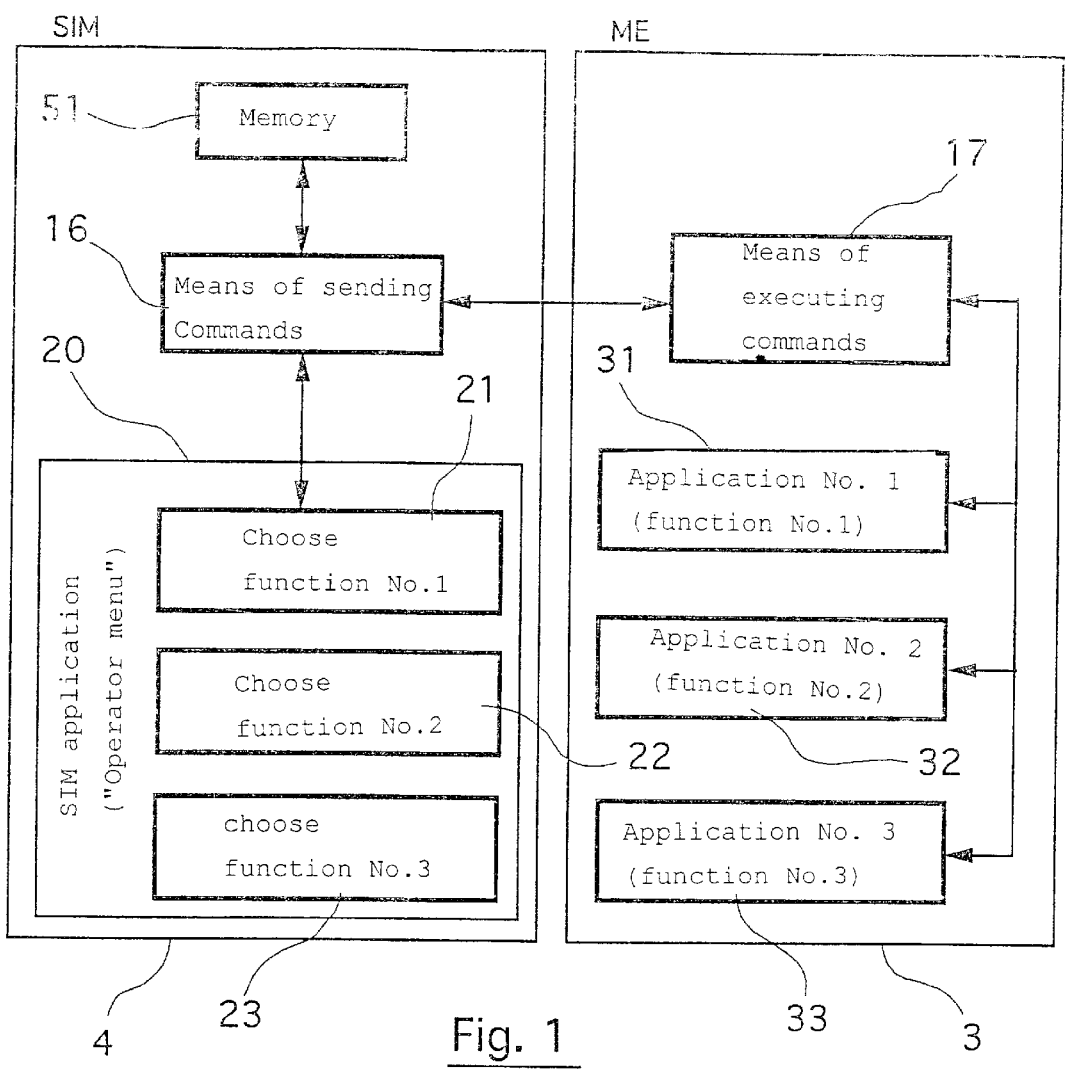
FIG. 1 shows a simplified diagram of a mobile station for embodiment of the process according to the invention.

Therefore, the invention relates to a process for running a terminal application (or part of a terminal application) by a terminal 3 forming part of a mobile station 2 belonging to a radio communication system.

For simplification purposes, the rest of the description only refers to "running a terminal application". However, it is clear that this expression could systematically be replaced by "running part of a terminal application", without going outside the framework of the invention.

Throughout the rest of this description, the special case of a GSM type radio communication system is considered. However, it is clear that this invention is not restricted to this type of radio communication system.

Remember that a Mobile Station 2 (MS according to the GSM terminology) comprises a terminal 3 "Mobile Equipment" or ME according to the GSM terminology) cooperating with a Subscriber Identity Module 4 (SIM using the GSM terminology. For further information about the terminal 3 and the subscriber identification module 4, refer to ETSI standards "GSM 11.11 and GSM 11.14 (Phase2+)" that are inserted here by reference.

It is assumed that terminal 3 can execute several terminal applications, each of which can offer a distinct function to the user. For example they could be:

application No. 1 (function No. 1); a browser application 31 that enables the terminal 3 to browse through an Internet type computer network, after communication has been setup between the terminal and an access platform;

application No. 2 (function No. 2); a payment and/or reservation and/or viewing application 32, enabling the terminal to benefit from at least one payment and/or booking and/or viewing service offered by a services server, after communication has been setup between the terminal and the services server;

application No. 3 (function No. 3); a message editing application (for example an "SMS editor") 33, through which the terminal can display short messages previously received from an SMS center on the terminal.

The case of the two services applications 31, 32 is described in more detail later in relation with FIGS. 2 and 3.

Furthermore, it is assumed that the subscriber identification module 4 can execute an "operator menu" 20 (or "SIM application"). In other words, it is assumed that the terminal 3 and the subscriber identification module 4 are of the type that can make use of the "SIM Application Toolkit" as described in the ETSI standard "GSM 11.14 (Phase 2+)" (which is inserted here by reference). The subscriber identification module 4 is then qualified as "SIM proactive", using the GSM terminology. In summary, the "SIM Application Toolkit" is a set of commands and procedures that the subscriber identification module 4 uses to take control and send commands to the terminal 3.

In the preferred embodiment of the invention presented as an example, the operator menu 20 proposes different functions to the user (choice references 21 to 23) each corresponding to the terminal 3 executing a distinct terminal application 31 to 33.

More precisely, when the user selects one of the possible function choices 21 to 23 in the "operator menu", the following steps are executed:

the subscriber identification module 4 sends a command for the terminal 3 to run the terminal application concerned (in other words, terminal applications 31 to 33 corresponding to the validated choice);

terminal 3 executes this start command so as to run the terminal application concerned and take control.

For example, if the user chooses function No. 1 in the "Operator menu", the browser 31 will be started. Similarly, the choice of function No. 2 will start the payment and/or booking and/or viewing application 32. Finally, choice of function No. 3 will start the SMS editor 33.

The subscriber identification module 4 and the terminal 3 comprise specific means for implementing these steps. Thus, the subscriber identification module 4 comprises means 16 of sending start commands to the terminal 3. Furthermore, the terminal 3 comprises means 17 of executing the start commands mentioned above. For example, these send means 16 and execution means 17 may be built around a microprocessor.

We will now describe two variant embodiments of the process according to the invention, that differ by the nature of the start command sent by the subscriber identification module 4 to the terminal 3.

According to the first variant embodiment, the command sent to terminal 3 by the subscriber identification module 4 is specific to the application to be run.

With reference to the example described above, the subscriber identification module 4 has three distinct specific commands which enable the terminal to run applications No. 1, 2 and 3 (references 31 to 33) respectively. For example, these three specific commands which may be new commands in the "SIM Application Toolkit" command set, may be written as follows:

"Run Application i (P)"

where $1 \leq i \leq 3$ (however, it is obvious that this is only an example and that in general i may be equal to other values) and P is a set of optional parameters, for example call parameters in the form ($P_{1,i}$, $P_{2,i}$, etc.)

According to the second embodiment, the command sent by the subscriber identification module 4 to the terminal 3 is a first generic command with parameters defining the second command specific to the application to be run. The first command is generic in the sense that it can be used to start different second commands one by one, each specific to a distinct application to be run. The terminal firstly executes the first generic command in order to extract the second specific command, then executes the second specific command in order to run the terminal application and take control.

Considering the example mentioned above again, the subscriber identification module 4 has a first generic command that can be configured with any one of the three second distinct specific commands, so that terminal can run applications No. 1, 2 and 3 respectively (references 31 to 33).

For example, the first generic command which could be a new command in the "SIM Application Toolkit" command set, is written:

"Run AT Command (C)", where C is one of the following three specific AT commands:

"Run Application i (P)", $1 \leq i \leq 3$, where P is an optional set of parameters, for example call parameters in the form ($P_{1,i}$, $P_{2,i}$, etc.).

Figure 3:
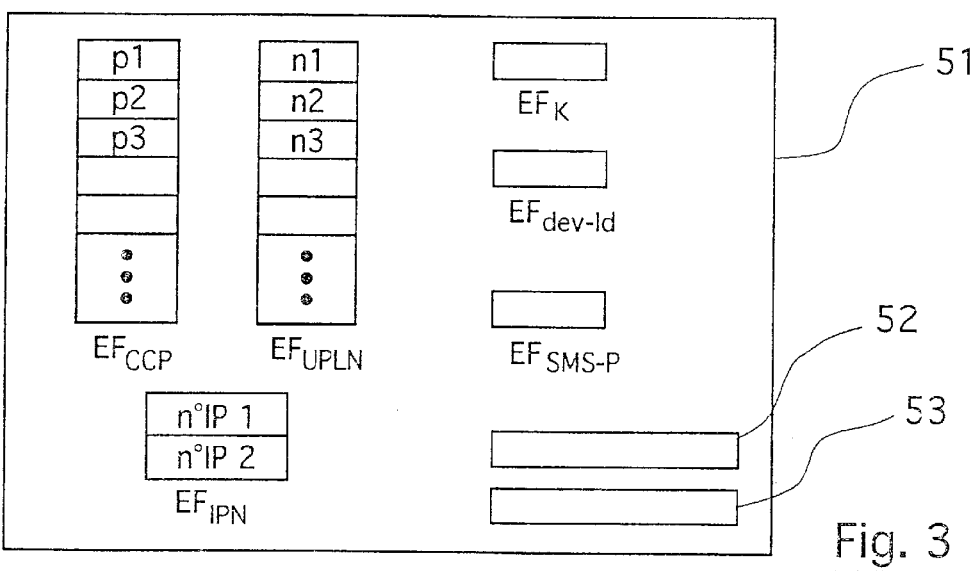
FIG. 3 partially shows an example of the contents of the memory area of the subscriber identification module that appears in FIG. 1, in the case of the particular application described in FIG. 2.
Figure 2:
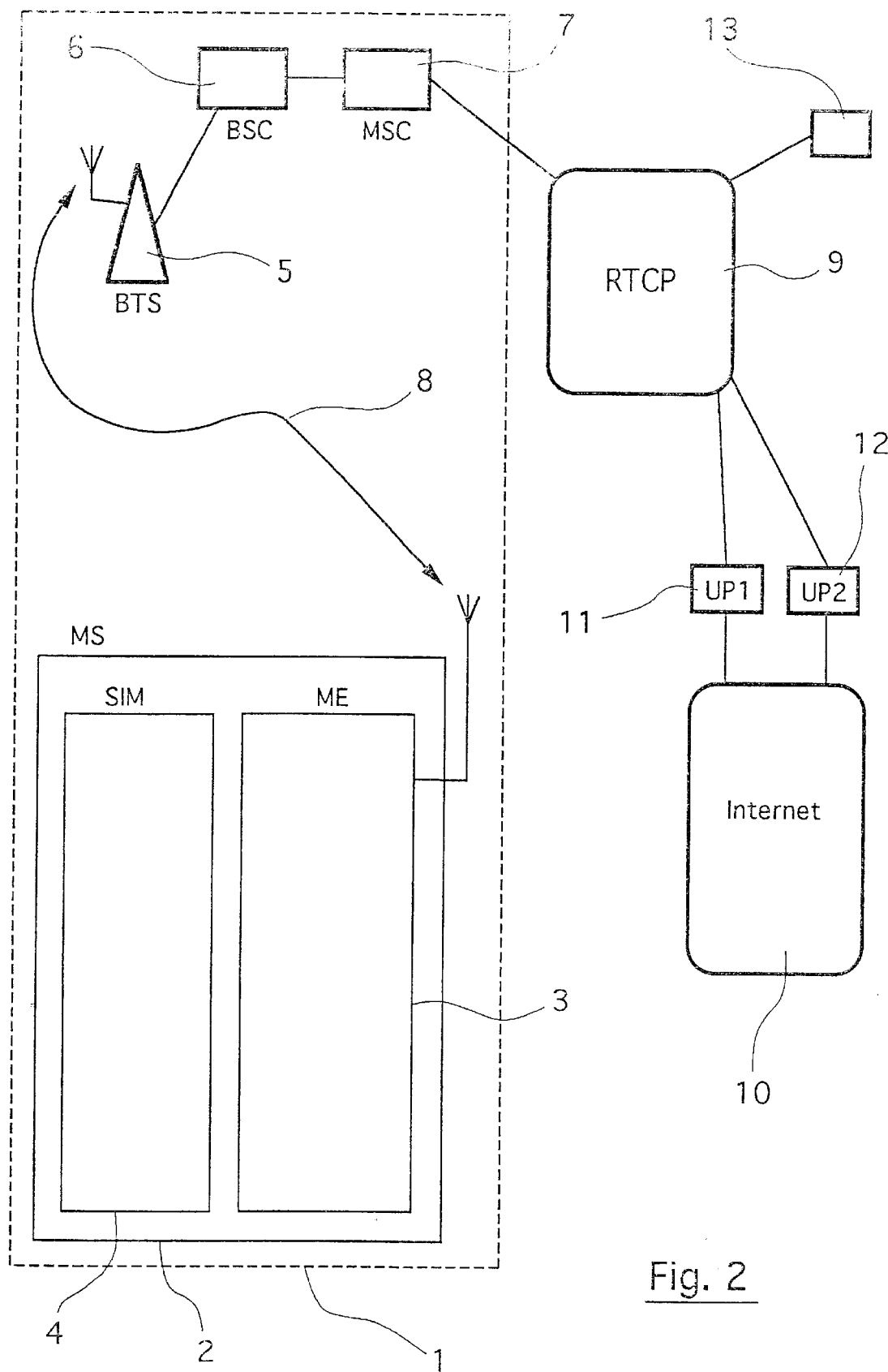
FIG. 2 shows a global block diagram that explains the particular application of the process according to the invention, in the case in which the terminal application to be run is a service's application for which communication has to be setup between the terminal and a service's server.

We will now describe the general principle for accessing a services server from a mobile station 2, with relation to FIGS. 2 and 3, before presenting a particular application of the process according to the invention. This particular application corresponds to the case in which the terminal application to be run is a services application for which a communication has to be setup between the terminal and a services server.

The block diagram shown in FIG. 1 presents the structure of a GSM type radio communication system 1. A number of mobile stations 2 move about within a geographic cells network (not shown). Each cell corresponds to the radio coverage of a base station 5 (or BTS for "Base Transceiver Station" using the GSM terminology). The mobile station 2 communicates through the air interface 8 with the base station 5 in the cell in which it is located. Base stations are managed by a Base Station Controller (BSC) 6, using the GSM terminology. Several base station controllers 6 may be controlled by a Mobile Service Switching Center (MSC) 7, using the GSM terminology, which is the master element of a GSM network. The switching center 7 is connected to the Public Switched Telephone Network (PSTN) 9. It should be noted that for simplification purposes, only one of each type of element 2, 5, 6 and 7 in the structure is shown in FIG. 1.

In general, in a manner known in itself, the terminal cannot access a services server unless it is able to execute a services application specific to the given services server, enabling the terminal to benefit from the service (or services) offered by this given services server. For example, in FIG. 1 it is assumed that there are:

two access platforms 11 (UP1), 12 (UP2), which are two particular services servers each offering an access service to an Internet type computer network 10;

a payment and/or booking and/or viewing server 13.

Remember that a user can use an access platform to browse within the Internet type computer network, in other words to access other servers present on this Internet type computer network. These other servers, usually called Internet servers, support Web sites, each offering at least one payment service (management of a bank account, transactions, etc.) and/or booking service (train tickets, aircraft tickets, shows, etc.) and/or viewing service (weather, timetables, etc.).

Remember furthermore that a payment and/or booking and/or viewing server 13 offers the same nature of services as the Internet servers mentioned above, but the difference is that it is accessible directly rather than through an access platform. In other words, the second type of services server is not an Internet server, and therefore is not accessible through the Internet type computer network.

For the purposes of this description, an Internet type computer network refers to the world network called "Internet" (which is a network connecting very many machines which is currently expanding very quickly), but also to any type of computer network and/or telephone communication network making use of the Internet technology. Remember that the Internet network (the worldwide web) is not the only type of telecommunication network using the Internet technology. In particular, an organization can perfectly well deploy its own network, usually called an "Intranet network" based on the Internet technology, without being connected to the Internet network (the worldwide web).

In the rest of this description, as an illustrative and non-restrictive example, details are given solely for the case of an access to one access platform 11, 12. However, it is clear that the access mechanism described below is equally applicable in the case of an access to any type of the services server and particularly to a server offering one or several payment and/or booking and/or viewing services.

The terminal 3 must execute a browser 31 type of services application in order to access an access platform, and to an Internet type computer network 10 through this access platform. For example, the browser marketed by the Unwired Planet company named "UP.Browser" (registered trademark) could be used. Conventionally, the browser 31 uses a specific language and enables the terminal 3 to browse within the Internet type computer network (in other words to connect to Web sites so that it can exchange all types of information with them). Before it can start browsing, the terminal 3 must have setup communication with an access platform to this Internet type computer network 10. It should be noted that in the example presented, two access platforms 11 (UP1), 12 (UP2) are available. For example, they could be platforms of the type called "UP.link" (registered trademark) marketed by the Unwired Planet company.

For example, the specific language used by the browser 31 could be "WAP/HDML" ("Wireless Application Protocol/ Handled Device Mark-up Language"). For further information about this language, and about the WAP and HDML (registered trademark) concepts in general, refer to the following documents inserted here by reference:

for HDML (these documents can be referred to on the "http://www.uplanet.com" URL):
"HDML Specification" version 2.0, Apr. 11, 1997;
"UP.link (registered trademark) administration guide", version 3.0, April 1998;

for WAP (these documents can be consulted on the "http.//www.wapforum.org/" URL).
"WAP Architecture Specification", WAP Forum, Apr. 30, 1998;
"Wireless Transport Layer Security Specification", WAP Forum, Apr. 30, 1998;
"WML Scrip Language Specification", WAP Forum, Apr. 9, 1998;
"WAP Security Smart Card", draft version 0.1 (1998–06).

In general, the services application (executed by the terminal) may be written in any language, for example such as the JAVA language (registered trademark).

It is obvious that the same services server could be accessible in different ways, each corresponding to a different parameter set. The same services server may have several telephone numbers, or may accept different transmission modes under the same number.

According to this invention, the subscriber identification module 3 sends a specific start command through the terminal browser to the terminal (directly or as a parameter of a generic command). This specific command has a set of parameters comprising an identifier of an access platform telephone number and several call parameters (for example defining a predetermined transmission mode). When it receives this specific command, the terminal attempts to setup communication with the access platform using the parameter set mentioned above. If the communication with the access platform is actually setup, the terminal starts the browser so that the terminal can browse within the Internet type computer network.

We will now describe each of the steps in this particular embodiment of the process according to the invention, in sequence.

Step 1: for example in each (or some) of its initializations, the terminal 3 reads a predetermined list of parameter sets in a memory area 51 of the subscriber identification module 4, each parameter set defining a services server telephone number, a transmission mode and possibly other call parameters. An example of the structure of the memory area 51 is presented in detail later in relation to FIG. 3.

Step 2: the subscriber identification module 4 sends a specific command to terminal 3 (directly or as a parameter of a generic command), asking terminal 3 to start the browser. A first set of parameters is sent with this specific command.

Step 3: when it receives this specific command, the terminal attempts to setup communication with the access platform using the information in the first set of parameters. For example, the objective may be to setup communication with the first platform UP1 in digital mode.

Step 4: if communication is actually setup, the terminal 3 starts the browser so that it can browse within the Internet type computer network;

Step 5: the services server (UP1 in the example mentioned above) authenticates the subscriber identification module 4.

We will now describe an example of the contents of the memory area 51 of the subscriber identification module 4, with reference to FIG. 3.

As explained above (see step 1), this memory area 51 stores components of the parameter sets used to build up the specific browser start command (or more generally a services application). Remember that these components elements could comprise for example:

a list of services server numbers (n1, n2, n3, etc.). For UP access platforms, these numbers may for example be stored in an elementary file $EF_{UPLN}$ (for "Elementary File$_{UP\ Link\ Number}$");

the list of call parameters (p1, p2, p3, etc.) for example transmission modes (digital modes, analog mode, etc.) corresponding to different services server numbers. For example, these call parameters may be stored in an elementary file $EF_{CCP}$ ("Elementary File$_{Capability\ Configuration\ Parameters}$") in the memory area 51. Like the platform numbers, these parameters will be read in advance by the terminal (in step 1).

Optionally, the memory area 51 of the subscriber identification module 4 (and not the terminal 3) also stores information that will be useful to the browser 31 after it has been started. For example, it may include:

IP type numbers stored in an elementary file $EF_{IPN}$ ("Elementary File$_{Internet\ Protocol\ Number}$");

a secret browser authentication and/or data encryption key on the Internet type computer network, stored in an elementary file ("Elementary File$_{Kcy}$"). This secret key is used during each session between the browser and one of the access platforms;

a user identifier with each access platform stored in an elementary file $Ef_{dev\_Id}$ ("Elementary File$_{device\_Identifier}$");

numbers of the short messages service center stored in an elementary file $EF_{SMS-P}$ ("Elementary File$_{Short\ Message\ Service—Parameters}$");

etc.

What is claimed is:

1. A process in which a terminal runs at least part of a terminal application under the control of a subscriber identification module cooperating with the said terminal, initiating the process using technical choices made by the radio communication system operator, by means of additional functions within an operator menu, the subscriber identification module and the terminal forming part of a mobile station included in a radio communication system; characterized in that the said process comprises the following steps:

the subscriber identification module sends a first generic command to the terminal, to make the terminal start a second specific command to run at least part of a terminal application, the said first generic command including at least an identifier of the second specific command as a parameter, the said second specific command being specific to the said part (or all) of a terminal application;

the terminal executes the said first generic command so as to extract the said second specific command, and then executes the said second specific command so as to run the said part (or all) of a terminal application and to take control.

2. Process according to claim 1, characterized in that the second specific command belongs to a set comprising a number of second distinct specific commands, each of which can run at least part of a distinct terminal application.

3. Process according to claim 1, characterized in that the said second specific command is an "AT" command.

4. Process according to claim 1, characterized in that the first said generic command is a new command in the "SIM Application Toolkit" command set.

5. Process according to claim 1, characterized in that the said step in which the subscriber identification module sends the first generic command to the terminal is associated with a choice of an additional function, the said choice being offered to a user when the said subscriber identification module executes an operator application, the said send step being carried out if the user validates the choice of the additional function.

6. Process according to claim 1, characterized in that the terminal application, at least part of which is run by the terminal, belongs to the group comprising:

service applications which, if executed, enable the terminal to benefit from services offered by a services server after communication has been setup between the terminal and the services server;

message editing applications; and agenda editing applications.

7. Process according to claim 6, characterized in that some particular examples of the services are:

browsers, which enable the terminal to browse through an Internet type computer network, after a communication has been setup between the terminal and an access platform;

payment and/or booking and/or viewing applications, enabling the terminal to benefit from at least one payment service and/or booking and/or viewing service available through the services server, after communication has been setup between the terminal and the server.

8. Process according to claim 1, the terminal application being a services application, characterized in that the said second specific command is configured with a set of parameters comprising:

a services server telephone number identifier, and possibly, one or more call parameters, and in that the step in which the terminal executes the specific command comprises the following steps:

the terminal attempts to setup a communication with a services server, according to the set of parameters; and if the communication with the services server is actually setup, the terminal starts execution of the at least part of the services application, such that the terminal can benefit from the service(s) offered by the services server.

9. Subscriber identification module of a type included in a mobile station in a radio communication system cooperating with a terminal, characterized in that the subscriber identification module comprises means of implementing a process according to claim 1, by which the terminal runs the at least part of the terminal application, under control of the said subscriber identification module.

10. Terminal of a type included in a mobile station in a radio communication system and cooperating with a subscriber identification module, characterized in that the terminal comprises means of implementing a process according to claim 1, in which the terminal runs at least part of the terminal application, under control of the subscriber identification module.

* * * * *

UNITED STATES PATENT AND TRADEMARK OFFICE
CERTIFICATE OF CORRECTION

PATENT NO. : 6,671,522 B1
DATED : December 30, 2003
INVENTOR(S) : M. Patrice Beaudou It is certified that error appears in the above-identified patent and that said Letters Patent is hereby corrected as shown below:

<u>Title page, Item [54] and Column 1, line 1,</u>
Title, delete "THERMAL", insert -- TERMINAL --

<u>Title page,</u>
Item [56], References Cited, FOREIGN PATENT DOCUMENTS, delete "98/41220", insert -- 98/42120 --

Signed and Sealed this

Twenty-sixth Day of July, 2005

JON W. DUDAS
*Director of the United States Patent and Trademark Office*